United States Patent
Eisenkolb

(10) Patent No.: US 9,347,468 B2
(45) Date of Patent: May 24, 2016

(54) PANEL HOOK

(71) Applicant: Securo B.V., Bladel (NL)

(72) Inventor: Gustaaf Josephus Eisenkolb, Bladel (NL)

(73) Assignee: Securo B.V., Bladel (NL)

( * ) Notice: Subject to any disclaimer, the term of this patent is extended or adjusted under 35 U.S.C. 154(b) by 0 days.

(21) Appl. No.: 14/652,060

(22) PCT Filed: Dec. 18, 2013

(86) PCT No.: PCT/NL2013/050916
§ 371 (c)(1),
(2) Date: Jun. 12, 2015

(87) PCT Pub. No.: WO2014/098587
PCT Pub. Date: Jun. 26, 2014

(65) Prior Publication Data
US 2015/0322983 A1    Nov. 12, 2015

(30) Foreign Application Priority Data
Dec. 20, 2012   (NL) .................................... 2010019

(51) Int. Cl.
E05D 15/00    (2006.01)
A47H 13/00    (2006.01)
(Continued)

(52) U.S. Cl.
CPC   *F16B 2/12* (2013.01); *A47H 13/04* (2013.01); *A47H 13/16* (2013.01); *E06B 9/24* (2013.01); *Y10T 16/353* (2015.01)

(58) Field of Classification Search
CPC ... Y10T 16/353; Y10T 16/372; Y10T 16/375; Y10T 16/378; Y10T 16/3834; Y10T 16/3837; Y10T 24/3484; Y10T 24/3485; Y10T 24/3449; Y10T 24/3451; Y10T 24/3452; Y10T 24/51; F16B 2/12; A47H 13/00; A47H 13/01; A47H 13/02; A47H 13/04; A47H 13/06; A47H 13/16; A47H 15/00; A47H 15/02; A47H 15/04
See application file for complete search history.

(56) References Cited

U.S. PATENT DOCUMENTS 2,817,889 A * 12/1957 Kalal .................... A47H 13/04
                                                                      24/365
2,901,795 A *  9/1959 Graber ................... A47H 13/04
                                                                      16/87.2
(Continued)

FOREIGN PATENT DOCUMENTS

JP    2003235720 A  *  8/2003
NL       9301873        5/1995

*Primary Examiner* — Chuck Mah
(74) *Attorney, Agent, or Firm* — Marcus C. Dawes; Daniel L. Dawes

(57) ABSTRACT

A panel hook (1) designed for hooking a panel to be connected to the panel hock to a carrier, such as a rail, the panel hock comprising a strip (2) provided with a part (5) of I-shaped cross-section that is integral therewith, which part comprises a first flange (6), which races the strip, and a second flange (7), which forms a guide for a slide, wherein the slide engages round the second flange and comprises a hook-shaped element (15), wherein the l-shaped part comprises a profile between the flanges, and wherein the slide comprises at least, one projection (11) which engages the profile of the l-shaped part so as to prevent the slide from being moved in a first direction (13) along the second flange, whilst movement of the slide in an opposite, second direction (12) along the second flange is possible, a special feature being the fact that the panel hook further comprises a second slide (3) provided with a hook-shaped element (14), which second slide engages around the second flange, wherein the second slide comprises a projection that engages the profile of the 1-shaped part so as to prevent movement of the second slice in the second direction along the second flange, whilst on the other hand movement of the second slide in the first direction along a second flange is possible.

10 Claims, 2 Drawing Sheets

(51) Int. Cl.
  *F16B 2/12*    (2006.01)
  *E06B 9/24*    (2006.01)
  *A47H 13/04*   (2006.01)
  *A47H 13/16*   (2006.01)

(56) References Cited

U.S. PATENT DOCUMENTS

| | | | | |
|---|---|---|---|---|
| 2,931,612 A * | 4/1960 | Graber | ............... | A47H 13/04 16/87.2 |
| 3,178,760 A * | 4/1965 | Kalal | ............... | A47H 13/04 16/87.6 R |
| 4,277,865 A * | 7/1981 | Takazawa | ............... | A47H 13/04 160/348 |
| 4,407,051 A * | 10/1983 | Ryan | ............... | A47H 13/14 160/348 |
| 5,398,388 A * | 3/1995 | Coleman | ............... | G06F 15/0025 24/462 |
| 5,636,417 A * | 6/1997 | Eisenkolb | ............... | A47H 13/14 160/346 |
| 6,564,435 B1 * | 5/2003 | Chan | ............... | A47H 13/14 16/87.2 |
| 7,730,923 B2 * | 6/2010 | Zhang | ............... | E06B 9/323 160/178.1 R |
| 8,307,499 B2 * | 11/2012 | Ruffo | ............... | A47H 13/00 16/87.2 |
| 2003/0101554 A1 * | 6/2003 | Chan | ............... | A47H 13/14 24/716 |
| 2011/0290966 A1 * | 12/2011 | Ota | ............... | A47H 13/00 248/215 |

* cited by examiner

PANEL HOOK

BACKGROUND OF THE INVENTION

The present invention relates to a panel hook designed for hooking a panel to be connected to the panel hook to a carrier, such as a rail, the panel hook comprising a strip provided with a part of I-shaped cross-section that is integral therewith, which part comprises a first flange, which faces the strip, and a second flange, which forms a guide for a slide, wherein the slide engages round the second flange and comprises a hook-shaped element, wherein the I-shaped part comprises a profile between the flanges, and wherein the slide comprises at least one projection which engages the profile of the I-shaped part so as to prevent the slide from being moved in a first direction along the second flange, whilst movement of the slide in an opposite, second direction along the second flange is possible.

It is noted that within the framework of the invention the panel hook is in particular a hook for hooking a flexible panel to the carrier, which panel may in principle be made of any material, such as textile, plastic, rubber and the like. Preferably, the panel hook is designed for hooking a cloth, such as a cloth for a sunshade or the like or a curtain to the carrier, such as a curtain rail.

Such a panel hook configured as a curtain hook is generally known; it is connected to a curtain in the following manner. First, the known curtain hook is automatically placed under a sewing machine, such that the strip and the I-shaped part thereof fall into a pleat of a curtain being supplied. Then the material of the curtain and the curtain hook are fixed in place and finally the curtain hook is sewn to the curtain pleat. When this is being done, a needle of the sewing machine penetrates through the strip right beside the I-shaped part. The curtain can then be hooked to a curtain rail, with the hook-shaped elements of the panel hooks being hooked into eyes of so-called "runners" of the curtain rail. The slides can be moved downwards along the strips of the panel hooks for precise adjustment of the vertical position of the curtain relative to the rail. Movement of the slides in upward direction along the strips is not possible, however.

SUMMARY OF THE INVENTION

The object of the invention is to improve the prior art, more in particular to propose a panel hook which provides greater possibilities for hooking a panel to a carrier.

In order to achieve that object, a panel hook of the kind described in the introduction is according to the invention characterised in that the panel hook further comprises a second slide provided with a hook-shaped element, which second slide engages around the second flange, wherein the second slide comprises a projection that engages the profile of the I-shaped part so as to prevent movement of the second slide in the second direction along the second flange, whilst on the other hand movement of the second slide in the first direction along a second flange is possible. This makes it possible to connect two panels, in particular flexible sheets such as cloths or curtains, to the carrier, such as a rail, using one type of panel hook. More in particular, a possibility is thus created for connecting a curtain and a separate lining by means of the panel hooks and hooking the same to the rail, wherein the curtain and the lining can be independently adjusted for height relative to each other by moving the slides along the strip.

The part of the strip that faces the I-shaped part preferably has a smooth surface, whilst the other part of the strip is rough. The needle will penetrate through the smooth part and will not tend to deflect off any unevenness. Thus a more even curtain stitching can be formed. The rough part functions to cause some friction. By moreover making the smooth part thinner (for example between 0.3 and 0.5 mm instead of between 0.5 and 0.7 mm), the smooth part will be more easily bendable. This is important in connection with the forming of a flat pleat or a butterfly pleat in the panel. The strip can then be bent away from the I-shaped part thereof, as a result of which the aforesaid special pleats can be flatter and prettier.

In a preferred embodiment of a panel hook according to the invention, the second flange is interrupted along part of its length so as to make it possible to detach at least one of the slides from the second flange.

In another preferred embodiment of a panel according to the invention, the projection of at least one of the slides is movable between a first position, in which the projection engages the profile of the I-shaped part and the slide engages around the second flange, and a second position, in which the projection is spaced from the profile of the I-shaped part and the slide can be detached from the second flange.

In another preferred embodiment of a panel according to the invention, the hook-shaped elements face each other.

In another preferred embodiment of a panel according to the invention, the profile of the I-shaped part is a serrated profile. In another preferred embodiment, the profile of the I-shaped part is an aperture profile.

In another preferred embodiment of a panel hook according to the invention, the second flange is narrower than the first flange. Because the second or outer flange is narrower than the first or inner flange, it is also possible to use narrower slides. This achieves that the panel hook will not take up an oblique position upon being pushed on a stitch plate under the sewing machine, and that it is possible to form a stitching in a straight (i.e. non-arcuate) line on an edge of the curtain. Preferably, the second flange has a width of about 2.6 mm, whilst the first flange is about 5 mm wide.

The invention also relates to a separate slide as defined in a panel hook according to the invention, wherein the projection thereof is movable between a first position, in which the projection engages the profile of the I-shaped part in mounted position and the slide engages around the second flange, and a second position, in which the projection is spaced from the profile of the I-shaped part in mounted position and the slide can be detached from the second flange. The slide is in particular about 5 mm wide.

The invention also relates to a separate strip as defined in a panel according to the invention, wherein the second flange is interrupted along part of its length so as to make it possible to detach at least one of the slides from the second flange in mounted position. The strip is preferably made in one piece of plastic material.

BRIEF DESCRIPTION OF THE DRAWINGS

The invention will now be explained in more detail with reference to figures shown in the drawing, in which.

DETAILED DESCRIPTION OF THE INVENTION

Figure 1:
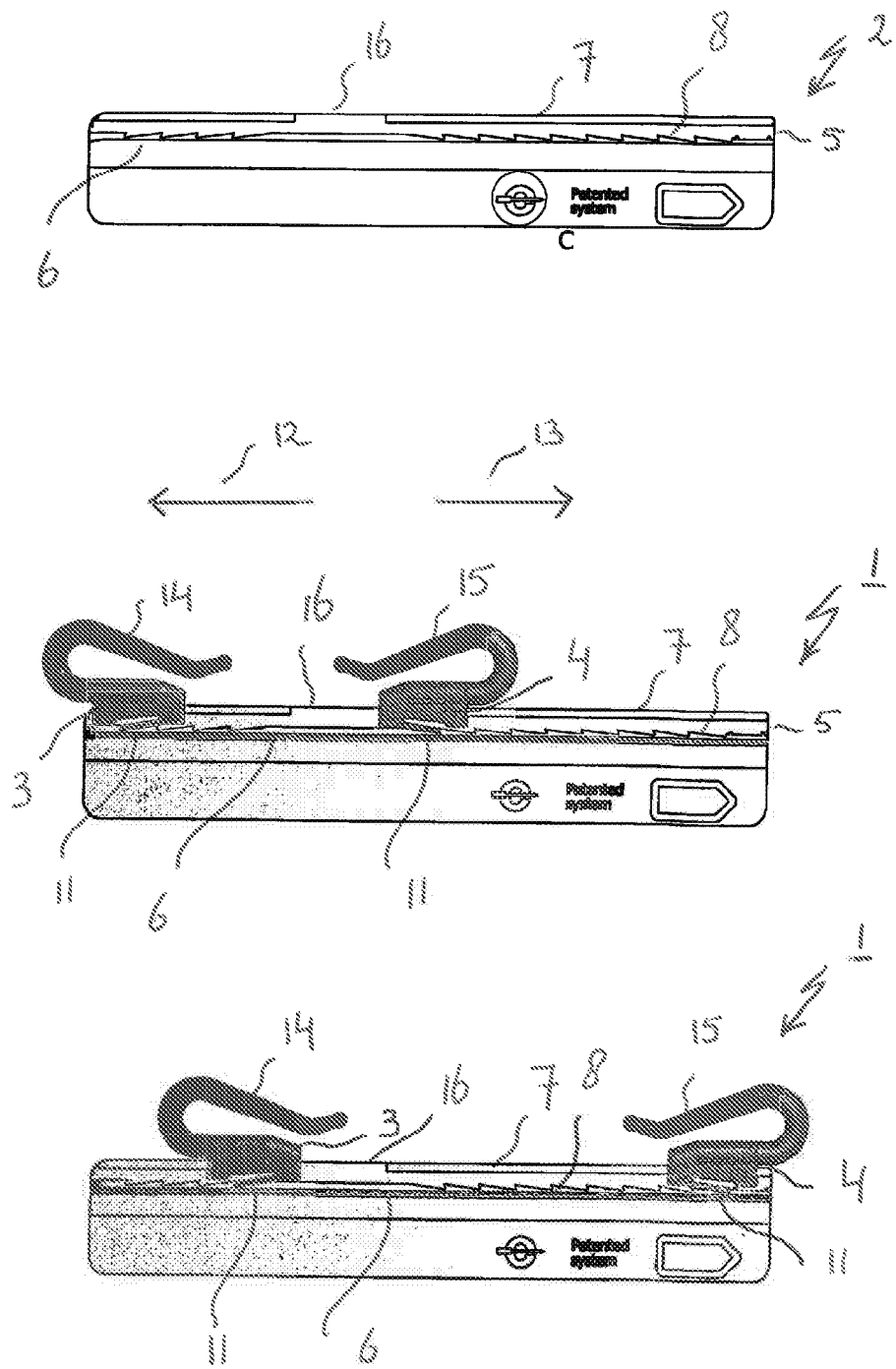
FIG. 1 shows a view of a separate strip used with the panel hook according to the invention, as well as views of the strip with slides provided thereon.

In FIG. 1 there is shown a preferred variant of a curtain hook 1 according to the invention, which consists of three parts, viz. a strip 2 made in one piece of plastic material (shown as a separate component at the top of FIG. 1), as well as two identical slides 3,4 provided thereon. At a longitudinal edge, the strip 2 comprises an I-profile 5 provided with a first flange 6, which faces the strip 2, and a second flange 7, which faces away from the strip 2. The flange 6 that faces the strip 2 comprises a serrated profile 8. The flange 7 that faces away from the strip 2 forms a guide for the slides 3,4, such that said slides can be moved in opposite directions along the second flange 7, as will be explained in more detail yet hereinafter.

Figure 2:
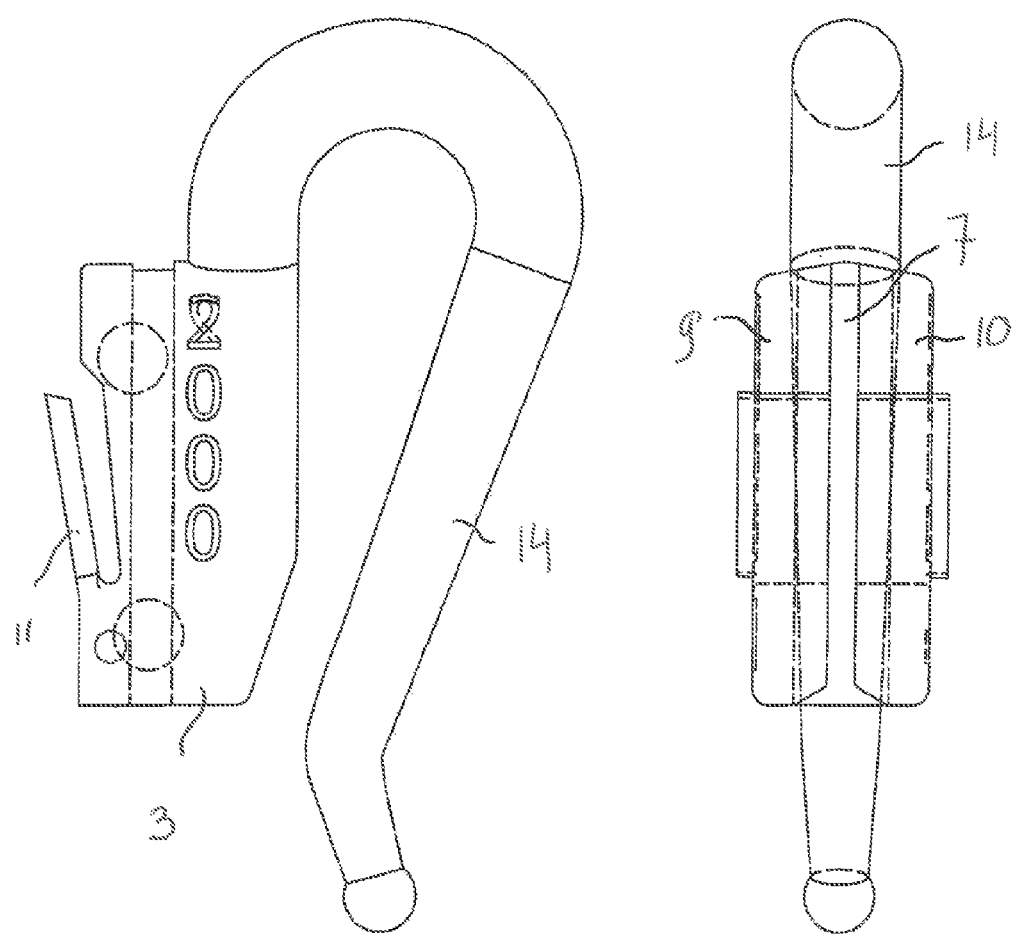
FIG. 2 shows various views of the slide used with the panel hook of FIG. 1.

As indicated in the right-hand bottom view of FIG. 2, the two slides 3,4 have a U-shaped cross-section, with the two slides 3,4 engaging around the second flange 7 with legs 9,10 of the U-shape. Both slides 3,4 are provided, on either side thereof, with projecting, downwardly extending spring projections or tongues 11 at the bottom of the legs 9,10. The spring tongues 11 engage the serrated profile 8 in such a manner that (a) movement of the slide 3 in a first direction (indicated by direction arrow 12) along the second flange 7 is impeded, whilst on the other hand manual movement of the slide 3 in an opposite, second direction (indicated by direction arrow 13) along the second flange 7 is possible;

(b) movement of the slide 4 in the second direction (indicated by direction arrow 13) along the second flanged 7 is impeded, whilst on the other hand manual movement of the slide 4 in the second direction (indicated by direction arrow 12) along the second flange 7 is possible.

Both slides 3,4 are provided with hook-shaped elements 14, 15 that face one another. This makes it possible to connect a curtain that is attached to the curtain hooks 1 to a curtain rail, which is done by inserting the hook-shaped elements 15 of the slides 5 of the curtain hooks 1 into eyes of runners that are movable along the rail. At the same time, a separate lining can be attached to the hook-shaped elements 14 of the slides 3 of the same curtain hooks 1, which is done by inserting the hook-shaped elements 14 into holes in the lining. The curtain and the lining can be independently adjusted for height relative to each other by moving the slides 3,4 in their respective directions 12,13 along the strip 2.

In order to prevent the slides 3,4 from coming into contact with each other upon being moved along the second flange 7, each slide 3,4 can be detached from the strip 2. The second flange 7 is to that end interrupted along part of its length. In other words, the second flange 7 is absent along part of the length of the strip 2, so that a removal opening 16 for the slides 3,4 is locally provided. Instead thereof, or in addition thereto, and as already said before, the projections 11 may be configured for springing movement, viz. between an outward position, in which the projections 11 engage the serrated profiles 8 and the slide 3,4 in question engages around the second flange 7, and an inward position, in which the projections 11 have been manually pushed inward and the slide 3,4 in question can be detached from the second flange 7.

The invention is not limited to the embodiment shown herein, but it also extends to other preferred variants that fall within the scope of the appended claims.

The invention claimed is:

1. A panel hook designed for hooking a panel to be connected to the panel hook to a carrier, the panel hook comprising:
 a strip provided with a part of I-shaped cross-section that is integral therewith, which part comprises:
  a first flange, which faces the strip, and
  a second flange, which forms a guide for a slide,
 wherein the slide engages around the second flange and comprises
 a hook-shaped element,
 wherein the I-shaped part comprises a profile between the flanges, and wherein the slide comprises at least one projection which engages the profile of the I-shaped part so as to prevent the slide from being moved in a first direction along the second flange, whilst movement of the slide in an opposite, second direction along the second flange is possible, and
 a second slide provided with a hook-shaped element, which second slide engages around the second flange,
 wherein the second slide comprises a projection that engages the profile of the I-shaped part so as to prevent movement of the second slide in the second direction along the second flange whilst on the other hand movement of the second slide in the first direction along a second flange is possible.

2. A panel hook according to claim 1, wherein the second flange is absent along part of its length so as to make it possible to detach at least one of the slides from the second flange.

3. A panel hook according to claim 1, wherein the projection of at least one of the slides is movable between a first position, in which the projection engages the profile of the I-shaped part and the slide engages around the second flange, and a second position, in which the projection is spaced from the profile of the I-shaped part and the slide can be detached from the second flange.

4. A panel hook according to claim 1, wherein the hook-shaped elements face each other.

5. A panel hook according to claim 1, wherein the profile of the I-shaped part is a serrated profile.

6. A panel hook according to claim 1, wherein the profile of the I-shaped part is an aperture profile.

7. A panel hook according to claim 1 wherein the second flange is narrower than the first flange.

8. A panel hook according to claim 1, wherein the strip is made of plastic material.

9. A slide as defined in a panel hook according to claim 1, wherein the projection of each slide thereof is movable between a first position, in which the projection engages the profile of the I-shaped part in mounted position and the slide engages around the second flange, and a second position, in which the projection is spaced from the profile of the I-shaped part in mounted position and the slide can be detached from the second flange.

10. A strip as defined in a panel hook according to claim 1, wherein the second flange is absent along part of its length so as to make it possible to detach at least one of the slides from the second flange in mounted position.

\* \* \* \* \*